US009071083B2

(12) United States Patent
Harris et al.

(10) Patent No.: US 9,071,083 B2
(45) Date of Patent: Jun. 30, 2015

(54) SUPER CAPACITOR SUPPLEMENTED SERVER POWER

(75) Inventors: Shaun L. Harris, Sammamish, WA (US); Scott Thomas Seaton, Kirkland, WA (US); Allan J. Wenzel, Seattle, WA (US); Daniel G. Costello, Redmond, WA (US); Christian L. Belady, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 932 days.

(21) Appl. No.: 12/796,505

(22) Filed: Jun. 8, 2010

(65) Prior Publication Data

US 2011/0302432 A1    Dec. 8, 2011

(51) Int. Cl.
| | | |
|---|---|---|
| G06F 1/32 | (2006.01) | |
| G06F 11/30 | (2006.01) | |
| H02J 7/00 | (2006.01) | |
| H02J 7/34 | (2006.01) | |
| G06F 1/30 | (2006.01) | |

(52) U.S. Cl.
CPC ............... *H02J 7/345* (2013.01); *G06F 11/30* (2013.01); *G06F 1/305* (2013.01)

(58) Field of Classification Search
CPC .......... G11C 5/04; G11C 5/14; G11C 11/565; H02J 7/345; H02J 7/00; H02J 9/00; G06F 1/26; G06F 1/263; G06F 1/28; G06F 1/305; G06F 1/32; G06F 11/30
USPC ................. 713/300, 310, 320–324, 330, 340
See application file for complete search history.

(56) References Cited

U.S. PATENT DOCUMENTS

| | | | |
|---|---|---|---|
| 6,628,107 B1 | 9/2003 | Bang et al. | |
| 6,836,097 B2 | 12/2004 | Turner et al. | |
| 6,847,192 B2 | 1/2005 | Turner et al. | |
| 6,914,411 B2 | 7/2005 | Couch et al. | |
| 7,286,556 B1 * | 10/2007 | Jackson | 370/445 |
| 7,321,209 B2 | 1/2008 | Westerinen et al. | |
| 7,802,121 B1 * | 9/2010 | Zansky et al. | 713/340 |
| 7,991,588 B1 * | 8/2011 | Krieger | 702/186 |
| 2005/0111243 A1 * | 5/2005 | Tzeng et al. | 363/39 |

(Continued)

FOREIGN PATENT DOCUMENTS

CN    1550664    12/2004

OTHER PUBLICATIONS

Simjee, et al., "Everlast: Long-Life, Supercapacitor-Operated Wireless Sensor Node", Retrieved at << http://portal.acm.org/citation.cfm?id=1165573.1165619 >>, in ISLPED Proceedings of the 2006 international symposium on Low power electronics and design, ACM, 2006, pp. 197-202.

Pay, et al., "Effectiveness of Battery-Supercapacitor Combination in Electric Vehicles", Retrieved at << http://www.labplan.ufsc.br/congressos/PowerTech/papers/385.pdf >>, Proceedings IEEE Bologna Power Tech Conference, Jun. 23-26, 2003, pp. 6.

(Continued)

*Primary Examiner* — Fahmida Rahman
(74) *Attorney, Agent, or Firm* — Henry Gabryjelski; Kate Drakos; Micky Minhas (57) ABSTRACT

Super capacitor supplemented server power is described. In embodiments, a power system manager is implemented to monitor the capability of one or more power supplies to provide power for a server system. The power system manager can determine that the capability of the power supplies to provide the power is deficient, and then engage one or more super capacitor power modules to provide supplemental power for the server system to mitigate the power deficiency.

20 Claims, 7 Drawing Sheets

(56) References Cited

U.S. PATENT DOCUMENTS

| | | | |
|---|---|---|---|
| 2006/0212636 A1* | 9/2006 | Yasuo | 710/303 |
| 2007/0033431 A1 | 2/2007 | Pecone et al. | |
| 2007/0139018 A1 | 6/2007 | Mentelos | |
| 2007/0186120 A1* | 8/2007 | Yasuo et al. | 713/300 |
| 2007/0234032 A1* | 10/2007 | Chen et al. | 713/100 |
| 2007/0278860 A1* | 12/2007 | Krieger et al. | 307/64 |
| 2009/0140575 A1 | 6/2009 | McGee et al. | |
| 2009/0254772 A1* | 10/2009 | Cagno et al. | 713/340 |

OTHER PUBLICATIONS

Durán-Gómez, et al., "An Approach to AchieveRide-Through of an Adjustable-Speed Drive with Flyback Converer Modules Powered by Super Capactors", Retrieved at << http://enjeti.tamu.edu/journal-papers/ride-thru-flybak-supercap.pdf >>, IEEE Transactions on Industry Applications, vol. 38, No. 2, Mar./Apr. 2002, pp. 514-522.

"Foreign Office Action", CN Application No. 201110162155.1, 12/25/014, 14 pages.

* cited by examiner

SUPER CAPACITOR SUPPLEMENTED SERVER POWER

BACKGROUND

Server systems often employ lead-acid batteries and uninterruptable power supplies to allow server devices to ride-through power outages and power disturbances. Batteries contain toxic substances, such as lead and acid electrolyte, and can produce dangerous hydrogen gas during cycling. Additionally, batteries have a limited cycle life and narrow temperature operating ranges that can limit battery performance in environments where server devices are typically employed. For example, temperatures found in data centers that use outside air for efficient cooling can significantly exceed temperature operating ranges for lead-acid batteries impacting battery performance.

Uninterruptable power supplies convert AC power to DC power for storage in batteries, and then convert the stored DC power back to AC power for distribution to server devices. Uninterruptable power supplies are also typically over-designed with reserve capacity dedicated to accommodate occasional spikes in computational demand on a server system. As a result, uninterruptable power supplies are inefficient sources of ride-through power for server devices because of losses associated with redundant power conversion and under-utilized reserve capacity.

SUMMARY

This summary is provided to introduce simplified concepts of super capacitor supplemented server power that are further described below in the Detailed Description. This summary is not intended to identify essential features of the claimed subject matter, nor is it intended for use in determining the scope of the claimed subject matter.

Super capacitor supplemented server power is described. In embodiments, a power system manager is implemented to monitor the capability of one or more power supplies to provide power for a server system, such as a server system that includes multiple server devices. The power system manager can determine that the capability of the power supplies to provide the power is deficient, and then engage one or more super capacitor power modules to provide supplemental power for the server system to mitigate the power deficiency and/or reduce the demand on one or more of the power supplies. The capability of a power supply to provide power for the server system may be related to a demand on the power supply, a status of an upstream power source for the power supply, or a status of the power supply. A power deficiency can be determined as an increase in demand on a power supply by the server system. A power deficiency may also be determined as a power disturbance, a failure of a power supply, or a loss of upstream power to a power supply.

In other embodiments, the power system manager can determine that the capability of the power supplies to provide the power for the server system has been restored and is sufficient. The power system manager can then disengage one or more of the super capacitor power modules to enable the super capacitor power modules to recharge. The power system manager can limit the recharge rate of a super capacitor power module to limit demand on the power supplies.

In other embodiments, a super capacitor power module includes super capacitor devices that are implemented as an energy storage device. The super capacitor power module includes a charging circuit, a regulation circuit, and an isolation circuit. The super capacitor power module also includes a module controller that can receive an instruction to apply supplemental power to a power bus that is utilized to power one or more devices, such as server devices in a server system. The module controller then enables the regulation circuit and disables the isolation circuit to apply the supplemental power to the power bus.

The regulation circuit can be enabled to regulate power from the energy storage device to provide the supplemental power. The regulation circuit can include a boost regulation to boost the voltage level of the power from the energy storage device. The isolation circuit can include switching devices that are driven with a pulse modulated signal to apply the supplemental power to the power bus. The isolation circuit may then be enabled to reduce demand on the power bus in response to the energy storage device being discharged. In an embodiment, the charging circuit can recharge the energy storage device from the power bus, and the charging circuit can limit the recharge rate to limit the demand on the power bus. The charging circuit may also include a charge pump to recharge the energy storage device to a voltage level that is higher than the voltage level of the power bus.

BRIEF DESCRIPTION OF THE DRAWINGS

Embodiments of super capacitor supplemented server power are described with reference to the following drawings. The same numbers are used throughout the drawings to reference like features and components.

DETAILED DESCRIPTION

Embodiments of super capacitor supplemented server power are described. In embodiments, a super capacitor power module can be implemented as a server system power source, and can be engaged to provide supplemental power for the server system to mitigate a power deficiency allowing the server system to continue to operate. For example, a super capacitor power module can be engaged to provide ride-through power to allow a server system to operate through power disturbances and/or power outages without relying on an uninterruptable power supply. A server system that can operate through a power disturbance without an uninterruptable power supply can be powered directly from a utility or generator, simplifying electrical design by eliminating the uninterruptable power supply.

A power system manager is implemented to protect server devices of a server system from power outages and/or power disturbances, such as by engaging a super capacitor power module to provide supplemental power when a capability of a power supply to provide power is determined to be deficient. The power deficiency can be determined based on an input and/or output of a power supply, a status of an AC input line, and/or a status of a power supply. The power system manager can also engage a super capacitor power module responsive to an increased computational demand on the server system to peak shave a demand on other power sources of the server system. A super capacitor power module that can be engaged to peak shave a demand on power sources provides that a data center, for example, can include more server devices to utilize capacity typically reserved to accommodate peaks in computational demand.

In various embodiments, a capability of a power supply to provide power for a server system is monitored. A deficiency of the capability of the power supply to provide power for the server system can be determined. A super capacitor power module can then be engaged to provide supplemental power for the server system to mitigate the power deficiency. The super capacitor power module, composed of super capacitor devices with a wide temperature operating range, can provide supplemental power in high temperature environments without performance issues. For example, a server system including super capacitor power modules can be implemented in a data center which efficiently utilizes outside air for cooling while operating at higher temperatures. In addition, super capacitor devices are environmentally compliant with industry standards for IT equipment requiring little maintenance and simplifying disposal.

While features and concepts of the described systems and methods for super capacitor supplemented server power can be implemented in any number of different environments, systems, and/or various configurations, embodiments of super capacitor supplemented server power are described in the context of the following example systems and environments.

Figure 1:
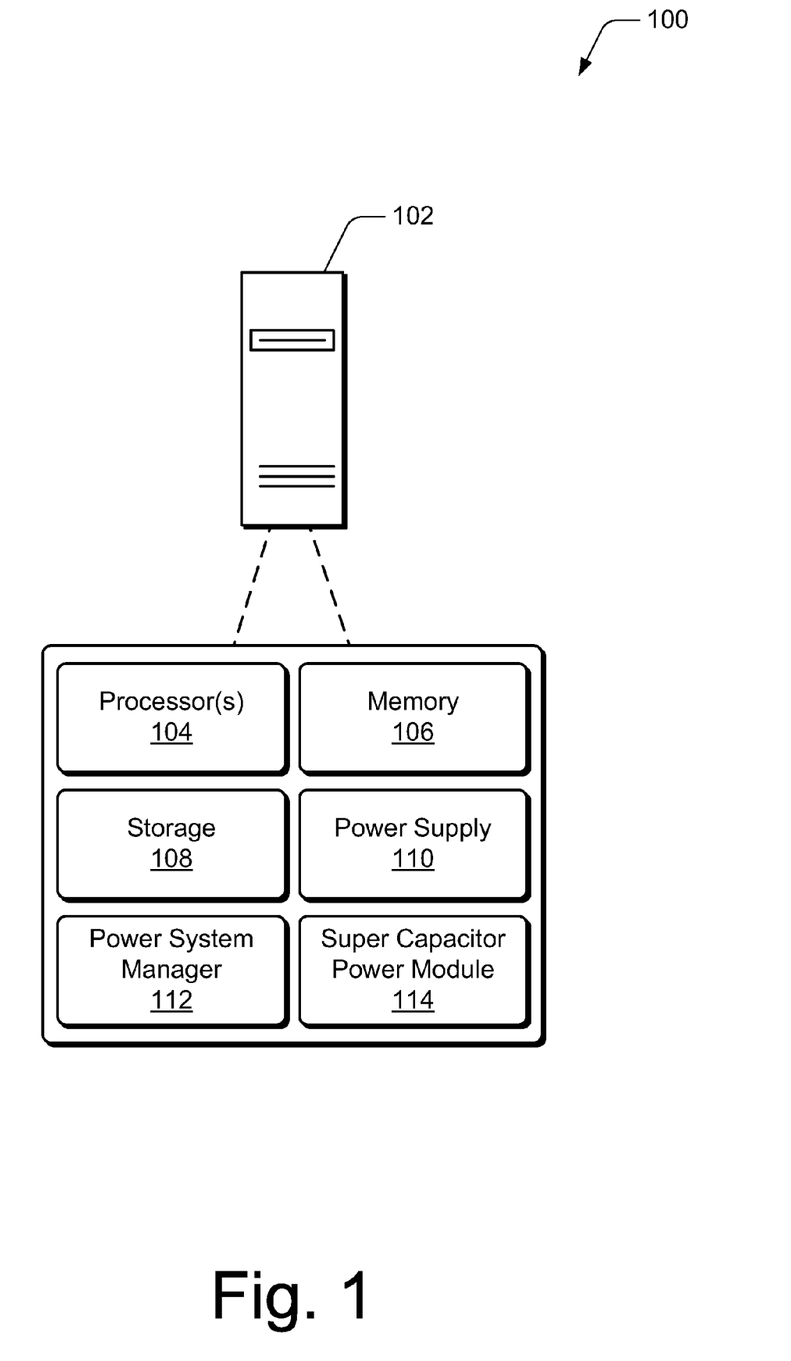
FIG. 1 illustrates an example system in which embodiments of super capacitor supplemented server power can be implemented.

FIG. 1 illustrates an example server system 100 in which various embodiments of super capacitor supplemented server power can be implemented. In embodiments, a server system may include one or more server devices configured individually or organized in racks, such as in a data center. In this example, the server system 100 includes a server device 102 that has one or more processors 104 to process computer-executable instructions that are a dynamic load on the server device. The server device 102 also includes memory 106 and storage 108 utilized in various aspects associated with the processors 104 processing the computer-executable instructions.

The server device 102 includes a power supply 110 that provides power for various components of the server device 102, including the processors 104, memory 106, and storage 108. The server device 102 also includes a power system manager 112 that is implemented to monitor a capability of the power supply 110 to provide power for the various components of the server device 102. In embodiments, the power system manager 112 can be implemented as computer-executable instructions and executed by the processors 104 to implement the various embodiments and/or features described herein. Alternatively or in addition, the power system manager 112 can be implemented as an integrated component of the power supply 110, or as an independent component of the server system 100.

The server device 102 also includes a super capacitor power module 114 that is implemented to provide supplemental power for the various components of the server device 102. In embodiments, the super capacitor power module 114 can be implemented as discrete arrays of one or more energy storage devices that can be engaged to provide supplemental power for the server device. In addition to the components that are described, the server device 102 can be implemented with any number and combination of differing components as further described with reference to the example device shown in FIG. 7.

In embodiments, the power system manager 112 can monitor the capability of the power supply 110 to provide power for the server device. The capabilities of a power supply to provide power can be related to a demand on the power supply 110, a status of an upstream power source for the power supply, or a status of the power supply. The power system manager 112 can determine that the capability of the power supply 110 to provide power is deficient, and then engage the super capacitor power module 114 to provide supplemental power for the server device 102 to mitigate the power deficiency and/or reduce the demand on the power supply. A power deficiency may be determined as an increased demand on the power supply 110 caused by an increased load on the server device 102. A power deficiency may also be determined as a power disturbance, a failure of the power supply 110, or a loss of upstream power to a power supply.

When a power deficiency is determined, such as when the capability of the power supply 110 to provide power for the server device 102 is deficient, the power system manager 112 is implemented to engage the super capacitor power module 114 to provide supplemental power for the server device 102 to mitigate the power deficiency. In another embodiment, the power system manager 112 can determine that the capability of the power supply to provide the power for the server device 102 has been restored and is sufficient. The power system manager 112 can then disengage the super capacitor power module 114, which enables the super capacitor power module to recharge. In an embodiment, the power system manager 112 is implemented to limit a recharge rate of the super capacitor power module 114 to limit demand on the power supply.

Figure 2:
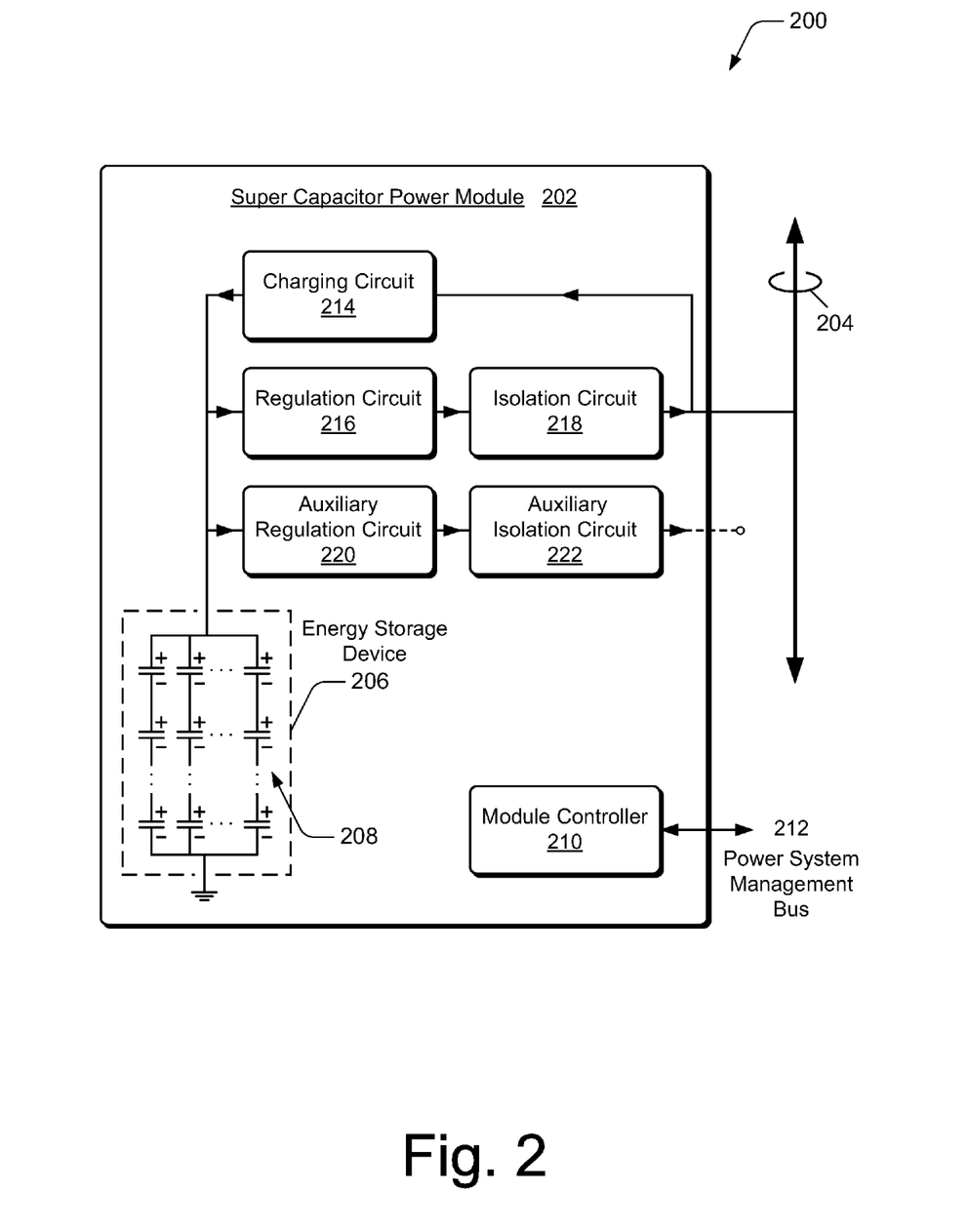
FIG. 2 illustrates another example system in which embodiments of super capacitor supplemented server power can be implemented.

FIG. 2 illustrates another example system 200 in which various embodiments of super capacitor supplemented server power can be implemented. The example system 200 includes a super capacitor power module 202, as well as a power bus 204. In embodiments, the super capacitor power module 202 is an example of the various super capacitor power modules described herein, such as the super capacitor power module 114 described with reference to FIG. 1. The super capacitor power module 202 includes an energy storage device 206 that can be implemented as discrete arrays of multiple energy storage devices 208.

The super capacitor power module 202 includes a module controller 210 that is implemented to control various circuits in the super capacitor power module, and interface with a power system management bus 212. The power system management bus 212 can include a serial bus, a parallel bus, discrete I/O lines, or any combination thereof. In an embodiment, an instruction can be received by the module controller 210 via the power system management bus 212 to initiate applying supplemental power from the energy storage device 206 to the power bus 204. The instruction may be received from a power system component that monitors a capability of a power bus to power a device connected to the bus.

The super capacitor power module 202 also includes a charging circuit 214, a regulation circuit 216, and an isolation circuit 218. The charging circuit 214 is implemented to recharge the energy storage device 206 from the power bus 204 when the super capacitor power module 202 is not engaged to apply power to the power bus. The charging circuit 214 may include a charge pump to recharge the energy storage device 206 to a voltage level that is higher than a voltage level of the power bus. Additionally, the module controller 210 can be implemented to limit the charge rate of the charging circuit 214 to reduce demand on the power bus.

The regulation circuit 216 is implemented to regulate power from the energy storage device 206 that is applied to the power bus. The regulation circuit 216 may include a boost regulator to boost a voltage level of the power from the energy storage device 206 responsive to the voltage level of the power from the energy storage device falling below a voltage level of the power bus. The isolation circuit 218 is implemented to isolate the regulation circuit 216 from the power bus, and may include an ORing controller to isolate an output of the regulation circuit from the power bus. Additionally, the isolation circuit 218 may include one or more switching devices that are driven with a pulse modulated signal to apply the supplemental power to the power bus.

In implementations, a super capacitor power module may include additional or auxiliary regulator and isolation circuits. In this example, the super capacitor power module 202 includes an auxiliary regulation circuit 220 and an auxiliary isolation circuit 222 to regulate power from the energy storage device 206 that is applied to power buses and/or devices, and to isolate the auxiliary regulation circuit 220.

In embodiments, the module controller 210 is implemented to enable the regulation circuit 216 and disable the isolation circuit 218 to apply supplemental power from the energy storage device 206 to the power bus 204 when an instruction is received. For example, the module controller 210 can drive switching devices of the isolation circuit 218 with a pulse modulated signal to apply the supplemental power from the energy storage device 206 to the power bus 204. The module controller 210 can also enable the isolation circuit 218 to reduce demand on the power bus and/or in response to the energy storage device 206 being discharged.

Figure 3:
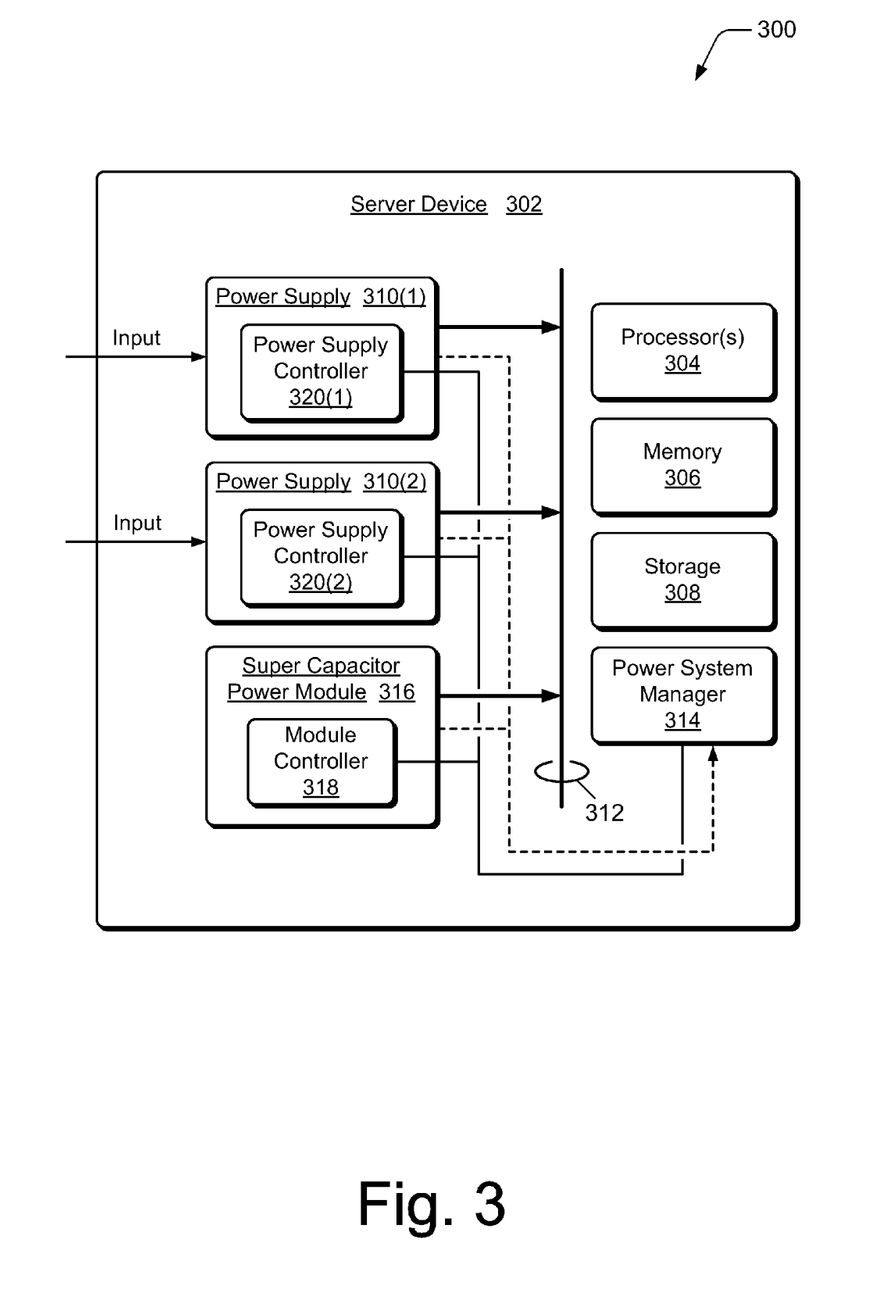
FIG. 3 illustrates another example system in which embodiments of super capacitor supplemented server power can be implemented.

FIG. 3 illustrates another example server system 300 in which various embodiments of super capacitor supplemented server power can be implemented. In this example, the server system 300 includes a server device 302 that has one or more processors 304 to process computer-executable instructions that are a dynamic load on the server device. The server device 302 includes memory 306 and storage 308 utilized in various aspects associated with the processors 304 processing the computer-executable instructions. The server device 302 also includes power supplies 310(1) and 310(2) that provide power for various components of the server device 302 via a power bus 312. Power from the power bus 312 may be distributed directly or indirectly to the components of the server device 302, including the processors 304, memory 306, and storage 308 by any number and/or combination of circuits.

The server device 302 includes a power system manager 314 that is implemented to monitor a capability of the power supplies 310 to provide power for the various components of the server device. In embodiments, the power system manager 314 can be implemented as computer-executable instructions and executed by the processors 304 to implement the various embodiments and/or features described herein. Alternatively, the power system manager 314 can be implemented as an independent component of the server device. The server device 302 also includes a super capacitor power module 316 that is implemented to provide supplemental power for the various components of the server device 302. The super capacitor power module 316 includes a module controller 318. In embodiments, the super capacitor power module 316 and the module controller 318 can be implemented as the super capacitor power module 202 and module controller 210 described with reference to FIG. 2.

In an implementation, the power system manager 314 can be powered separately and/or independently, such as via a standby or auxiliary rail of power supplies. In addition, the super capacitor power module 316 may be implemented to provide independent power for power system manager 314 via an auxiliary regulation circuit and an auxiliary isolation circuit, such as described with reference to the super capacitor power module 202 shown in FIG. 2.

In this example server device 302, the power supplies 310 (1) and 310(2) each include a respective power supply controller 320(1) and 320(2). The power supply controllers 320 collect and maintain various data relating to capabilities of the respective power supplies 310(1) and 310(2), including input and/or output power, a status of an AC input line, and/or a status of the power supply. In embodiments, the power system manager 314 is implemented to control and/or communicate with the module controller 318 of the super capacitor power module 316, as well as the power supply controllers 320 of the respective power supplies 310.

In embodiments, the power system manager 314 can monitor the capability of the power supplies 310 to provide power for the server device 302. The capabilities of the power supplies 310 to provide the power may relate to a demand on the power supplies 310, a status of an upstream power source for the power supplies 310, or a status of the power supplies. The power system manager 112 can determine that the capability of the power supplies 310 to provide power for the server device 302 is deficient, and then engage the super capacitor power module 316 to provide supplemental power for the server device 302 to mitigate the power deficiency and/or reduce the demand on the power supplies. A power deficiency may be determined as an increased demand on the power supplies 310 caused by an increased load on the server device 302. A power deficiency may also be determined as a power disturbance, a failure of one of the power supplies, or a loss of upstream power to the power supplies.

Figure 4:
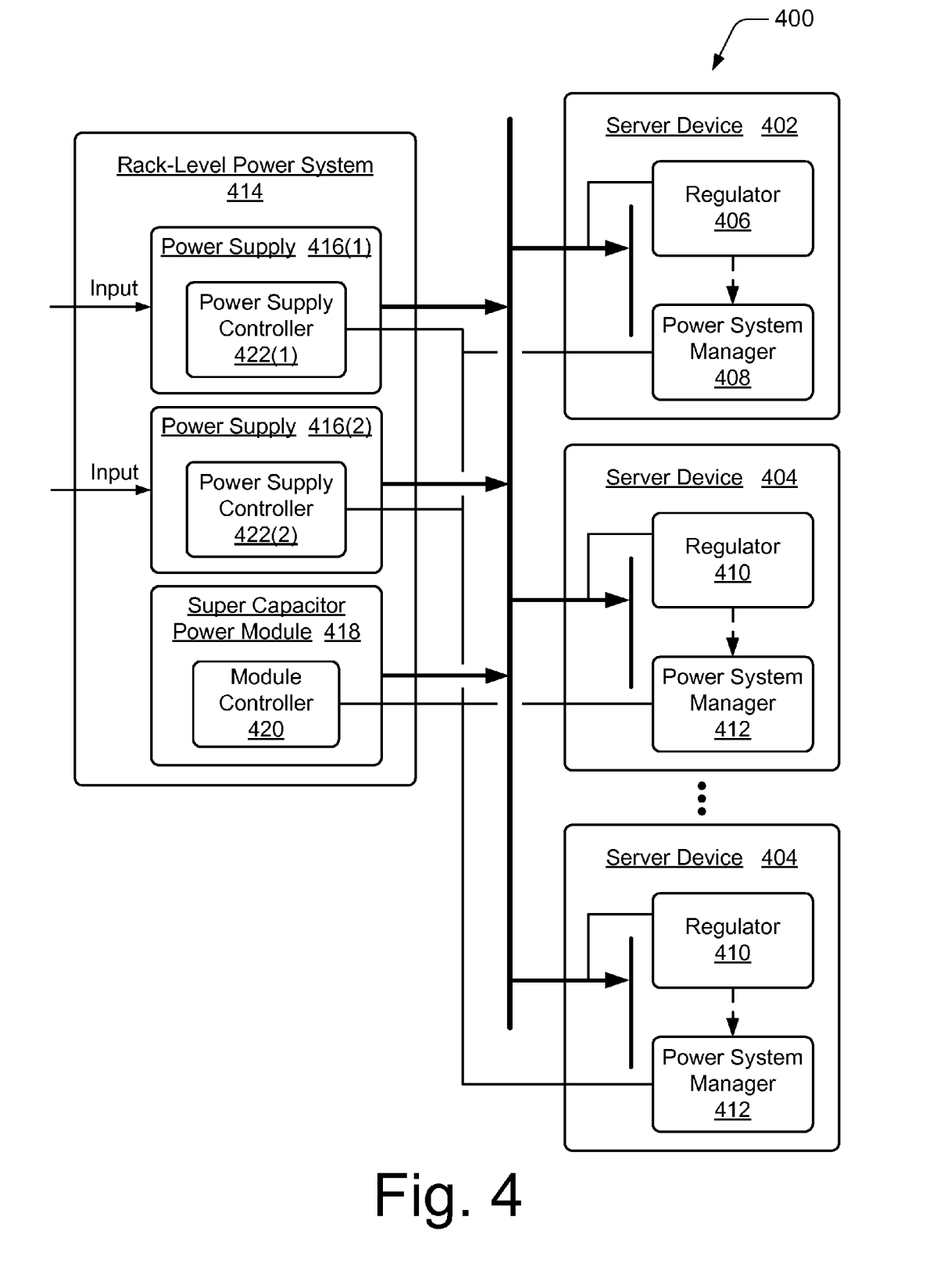
FIG. 4 illustrates another example system in which embodiments of super capacitor supplemented server power can be implemented.

FIG. 4 illustrates another example server system 400 in which various embodiments of super capacitor supplemented server power can be implemented. In this example, the server system 400 includes a server device 402, as well as any number of additional server devices 404 in a rack configuration. Each of the server devices 402 and 404 can be implemented as described with reference to the server devices shown in FIGS. 1 and 3. Additionally, any of the server devices 402 and 404 can be implemented with any number and combination of differing components as further described with reference to the example device shown in FIG. 7. In this example, each of the server devices include a regulator and a power system manager, such as described with reference to the power system manager 314 shown in FIG. 3. For example, server device 402 includes a regulator 406 that provides power to a power system manager 408. Similarly, each of the server devices 404 include a respective regulator 410 that provides power to a respective power system manager 412.

The example server system 400 includes a rack level power system 414 that provides power for the various server devices 402 and 404. The rack level power system 414 includes power supplies 416(1) and 416(2) that provide power for the various server devices of the server system 400. The rack level power system 414 also includes a super capacitor power module 418 that is implemented to provide supplemental power for the various server devices, and the super capacitor power module 418 includes a module controller 420. In embodiments, the super capacitor power module 418 and the module controller 420 can be implemented as the super capacitor power module 202 and module controller 210 described with reference to FIG. 2.

In this example, the power supplies 416(1) and 416(2) each include a respective power supply controller 422(1) and 422(2). The power supply controllers 422 collect and maintain various data relating to capabilities of the respective power supplies 416(1) and 416(2) including input and/or output power, a status of an AC input line, and/or a status of the power supply. In embodiments, the power system managers 408 and 412 are implemented to control and/or communicate with the module controller 420 of the super capacitor power module 418, as well as the power supply controllers 422 of the respective power supplies 416. Additionally, one of the power system managers can be implemented as a master power system manager that controls the other power system managers. For example, power system manager 408 at the server device 402 is configured as the master power system manager that controls the other power system managers 412.

In embodiments, the power system manager 408 (i.e., as the master power system manager) can monitor the capability of the power supplies 416 to provide power for one or more of the server devices 402 and 404. The power system manager 408 can determine that the capability of the power supplies 416 to provide power for the server devices is deficient, and then engage the super capacitor power module 418 to provide supplemental power for the server devices to mitigate the power deficiency and/or reduce the demand on the power supplies. In embodiments, the master power system manager 408 can mitigate a power deficiency by transmitting a throttle command to one or more of the other power system managers 412 to throttle a respective server device 404.

In addition to the embodiments of super capacitor supplemental server power described with reference to the server device shown in FIG. 3 and with reference to the rack system shown in FIG. 4, additional embodiments may be implemented at a data center level. Although not shown, one or more of the super capacitor power modules described herein can be implemented to replace the batteries in a battery room for a data center. The super capacitor power modules can then be monitored with a power system manager to provide supplemental and/or backup power to the racks in the data center (as opposed to just the servers in the racks).

Example methods 500 and 600 are described with reference to respective FIGS. 5 and 6 in accordance with one or more embodiments of super capacitor supplemented server power. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
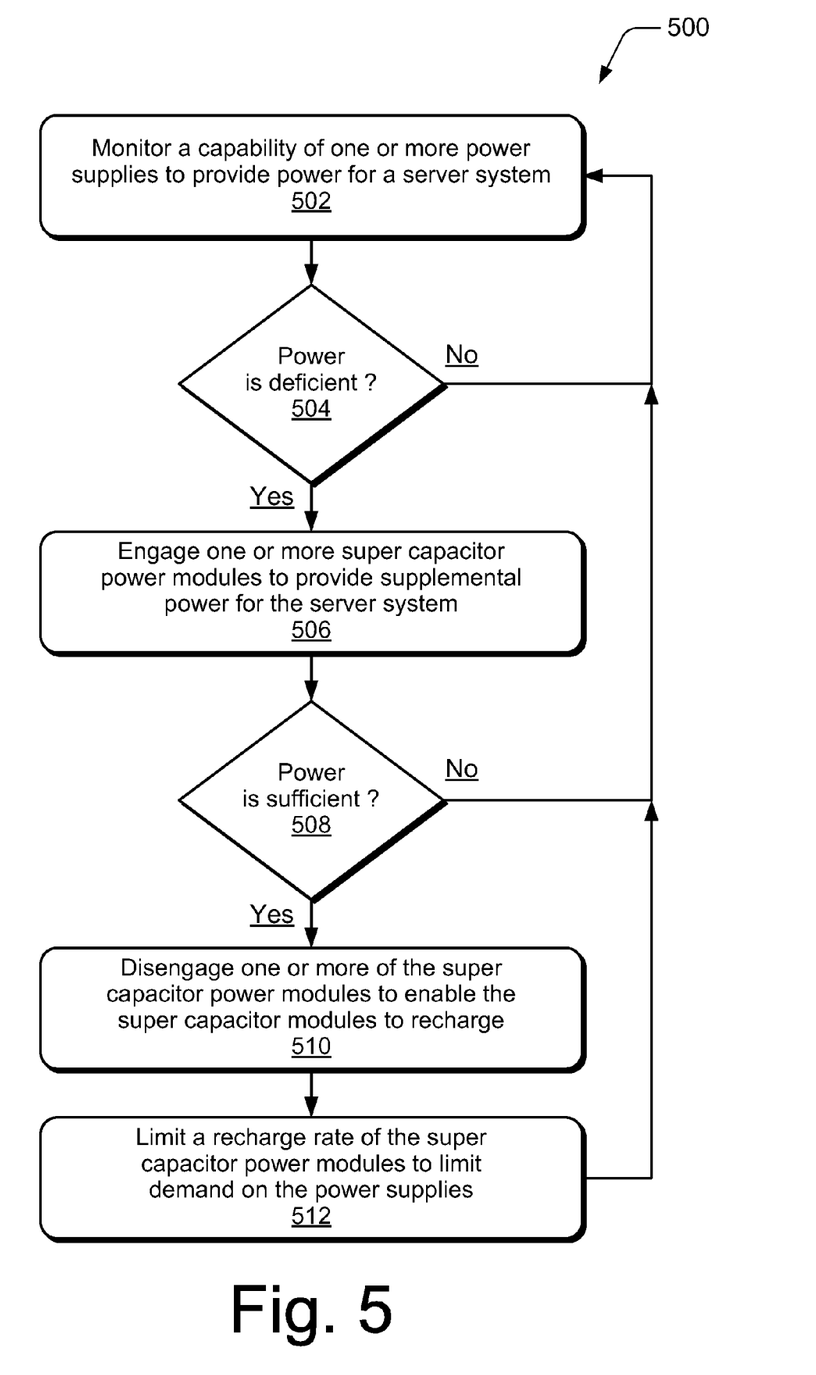
FIG. 5 illustrates example method(s) of super capacitor supplemented server power in accordance with one or more embodiments.

FIG. 5 illustrates example method(s) 500 of super capacitor supplemented server power. The order in which the method blocks are described are not intended to be construed as a limitation, and any number of the described method blocks can be combined in any order to implement a method, or an alternate method.

At block 502, a capability of one or more power supplies to provide power for a server system is monitored. For example, the power system manager 314 (FIG. 3) monitors the capability of the power supplies 310 to provide power for the server device 302 (e.g., a server system of one server device). Similarly, the power system manager 408 (FIG. 4) monitors the capability of the power supplies 416 to provide power for the various server devices 402 and 404 (e.g., a server system of multiple server devices). In additional embodiments, a power system manager monitors the power source that powers server racks in a data center that includes super capacitor power modules implemented to provide supplemental and/or backup power to the server racks.

At block 504, a determination is made as to whether the power for the server system is deficient. For example, the power system manager 314 (FIG. 3) determines whether the capability of the power supplies 310 to provide power for the server device 302 is deficient. Similarly, the power system manager 408 (FIG. 4) determines the capability of the power supplies 416 to provide power for the various server devices 402 and 404. The power for a server system may be determined deficient for various reasons, such as a loss of power in a data center or because the servers are spiking beyond the power that is available. In implementations, the power system manager 314 determines that power for the server device 302 is deficient for any one of various reasons. Similarly, the power system manager 408 determines that power for the various server devices 402 and 404 is deficient for any one of various reasons.

If a determination is made that the power provided to the server devices is not deficient (i.e., "no" from block 504), then the method continues at block 502 to monitor the capability of the power supplies to provide the power to the server system. If a determination is made that the power provided to the server devices is deficient (i.e., "yes" from block 504), then at block 506, one or more super capacitor power modules are engaged to provide supplemental for the server system to mitigate the power deficiency. For example, the power system manager 314 (FIG. 3) engages the super capacitor power module 316 to provide supplemental power for the server device 302. Similarly, the power system manager 408 (FIG. 4) engages the super capacitor power module 418 to provide supplemental power for the server devices 402 and 404.

At block 508, a determination is made as to whether the capability of the power supplies to provide the power for the server system is sufficient. For example, the power system manager 314 (FIG. 3) determines that the capability of the power supplies 310 to provide the power for the server device 302 has been restored and is sufficient. Similarly, the power system manager 408 (FIG. 4) determines that the capability of the power supplies 416 to provide the power for the server devices 402 and 404 has been restored and is sufficient.

If a determination is made that the power supplies are not capable of providing sufficient power to the server devices (i.e., "no" from block 508), then the method continues at block 502 to monitor the capability of the power supplies to provide sufficient power to the server system. If a determination is made that the power supplies are capable of providing sufficient power to the server devices (i.e., "yes" from block 508), then at block 510, if one or more super capacitor power modules are engaged, the super capacitor power modules are disengaged to enable the super capacitor power modules to recharge. For example, the power system manager 314 (FIG. 3) disengages the super capacitor power module 316 to enable the super capacitor power module to recharge. Similarly, the power system manager 408 (FIG. 4) disengages the super capacitor power module 418 to enable the super capacitor power module to recharge.

At block 512, a recharge rate of the super capacitor power modules is limited to limit demand on the power supplies. For example, the power system manager 314 (FIG. 3) limits the recharge rate of the super capacitor power module 316 to limit demand on the power supplies 310. Similarly, the power system manager 408 (FIG. 4) limits the recharge rate of the super capacitor power module 418 to limit demand on the power supplies 416. The method can then continue at block 502 to monitor the capability of the power supplies to provide the power to the server system.

Figure 6:
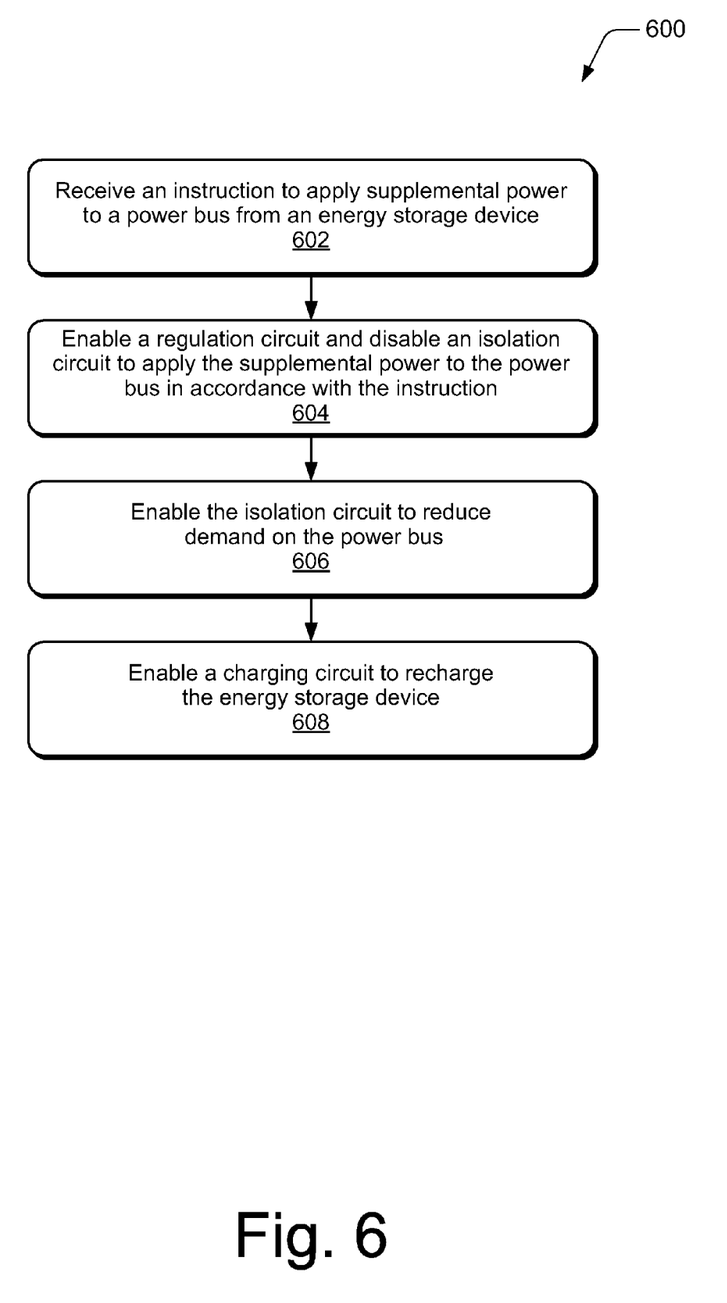
FIG. 6 illustrates additional example method(s) of super capacitor supplemented server power in accordance with one or more embodiments.

FIG. 6 illustrates example method(s) 600 of super capacitor supplemented server power. The order in which the method blocks are described are not intended to be construed as a limitation, and any number of the described method blocks can be combined in any order to implement a method, or an alternate method.

At block 602, an instruction is received to apply supplemental power to a power bus from an energy storage device. For example, the module controller 318 (FIG. 3) of the super capacitor power module 316 receives an instruction to apply supplemental power based on a determination by the power system manager 314 that the capability of the power supplies 310 to provide power for the server device 302 is deficient.

At block 604, a regulation circuit is enabled and an isolation circuit is disabled to apply the supplemental power to the power bus in accordance with the instruction. For example, the module controller 210 (FIG. 2) enables the regulation circuit 216 and disables the isolation circuit 218 to apply the supplemental power to power bus 204 in accordance with the instruction. The regulation circuit 216 may include a boost regulator to boost a voltage level of the power from the energy storage device 206 responsive to the voltage level of the power from the energy storage device falling below a voltage level of the power bus. The isolation circuit 218 may include one or more switching devices that are driven with a pulse modulated signal to apply the supplemental power to the power bus.

Optionally, at block 606, the isolation circuit is enabled to reduce demand on the power bus. In an embodiment, the isolation circuit is enabled in response to the energy storage device 206 being discharged. For example, the module controller 210 enables the isolation circuit 218 responsive to the energy device 206 being discharged in the super capacitor power module 202.

At block 608, a charging circuit is enabled to recharge the energy storage device. For example, the charging circuit 214 is enabled to recharge the energy storage device 206 of the super capacitor power module 202. The charging circuit may include a charge pump to recharge the energy storage device 206 to a voltage level higher than a voltage level of the power bus 204. The charging circuit 214 can also limit the recharge rate of the energy storage device 206 to reduce demand on the power bus.

Figure 7:
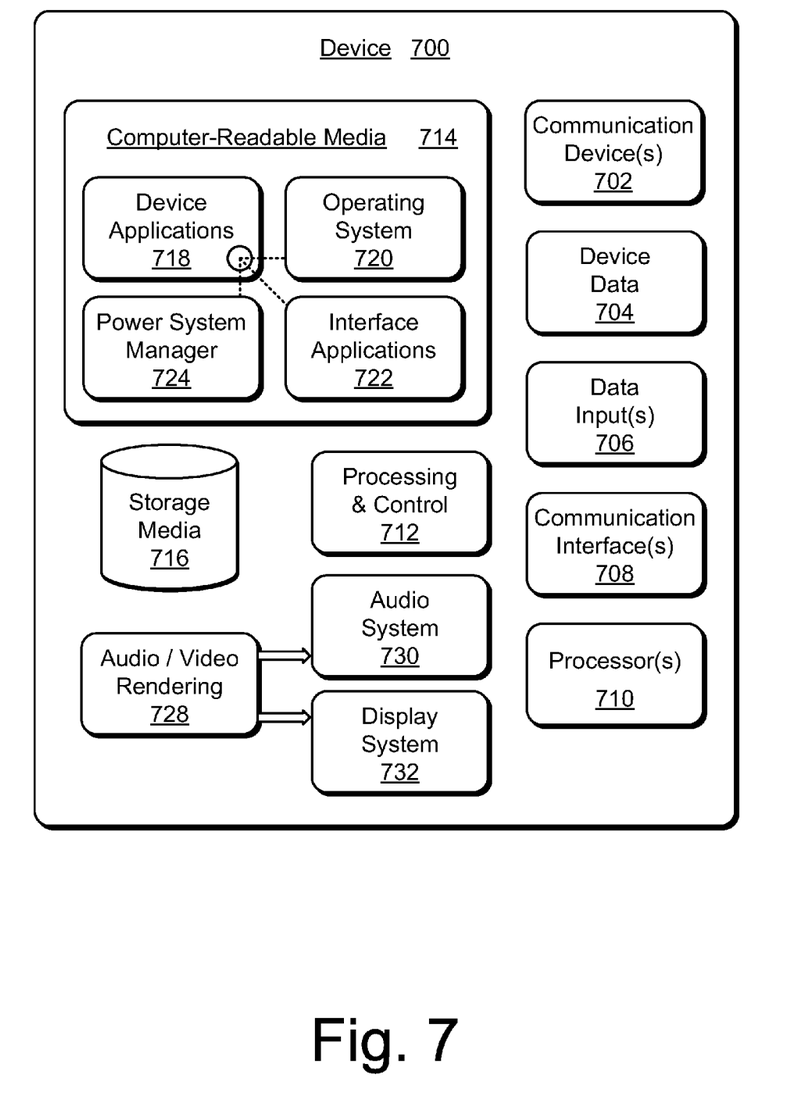
FIG. 7 illustrates various components of an example device that can implement embodiments of super capacitor supplemented server power.

FIG. 7 illustrates various components of an example device 700 that can be implemented as any type of server, electronic, and/or computing device as described with reference to FIGS. 1-6 to implement embodiments of super capacitor supplemented server power. In embodiments, device 700 can be implemented as any one or combination of a wired and/or wireless device, consumer device, computer device, server device, portable computer device, user device, communication device, appliance device, electronic device, and/or as any other type of device. Device 700 may also be associated with a user (i.e., a person) and/or an entity that operates the device such that a device describes logical devices that include users, software, firmware, and/or a combination of devices.

Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of super capacitor supplemented server power. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable storage media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media storage 714 provides data storage mechanisms to store the device data 704, as well as various device applications 718 and any other types of information and/or data related to operational aspects of device 700. For example, an operating system 720 can be maintained as a computer application with the computer-readable storage media 714 and executed on processors 710. The device applications 718 can include a device manager which may be implemented as any one or combination of a control application, software application, signal processing and control module, code that is native to a particular device, a hardware abstraction layer for a particular device, etc.

The device applications 718 also include any system components or modules to implement embodiments of super capacitor supplemented server power. In this example, the device applications 718 can include interface applications 722 and a power system manager 724, such as when device 700 is implemented as a server device. The interface applications 722 and the power system manager 724 are shown as software modules and/or computer applications. Alternatively or in addition, the interface applications 722 and/or the power system manager 724 can be implemented as hardware, software, firmware, or any combination thereof.

Device 700 also includes an audio and/or video rendering system 728 that generates and provides audio data to an audio system 730 and/or generates and provides display data to a display system 732. The audio system 730 and/or the display system 732 can include any devices that process, display, and/or otherwise render audio, display, and image data. Display data and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 730 and/or the display system 732 are implemented as external components to device 700. Alternatively, the audio system 730 and/or the display system 732 are implemented as integrated components of example device 700.

Although embodiments of super capacitor supplemented server power have been described in language specific to features and/or methods, it is to be understood that the subject of the appended claims is not necessarily limited to the specific features or methods described. Rather, the specific features and methods are disclosed as example implementations of super capacitor supplemented server power.

The invention claimed is:

1. A server system, comprising:
one or more server devices;
one or more power supplies configured to provide power for the one or more server devices;
one or more super capacitor power modules included at each of the one or more server devices, the one or more super capacitor power modules configured to provide supplemental power for the one or more server devices;
a power system manager included at each of the one or more server devices that is powered independently from the one or more power supplies that provide power for the one or more server devices, one of the power system managers being configured as a master power system manager to control the other power system managers, the master power system manager configured to:
monitor a capability of the one or more power supplies to provide the power for the one or more server devices;
determine, based at least in part on the monitored capabilities, that the capability to provide the power for the one or more server devices is deficient;
send an instruction to the one or more super capacitor power modules at each of the one or more server devices based, at least in part, on the determined deficient capability to provide the power; and
engage one or more of the super capacitor power modules to provide the supplemental power for the one or more server devices to mitigate the power deficiency by transmitting a throttle command to one or more of the other power system managers to throttle one or more of the respective server devices.

2. The server system as recited in claim 1, wherein the master power system manager is further configured to:
determine that the capability to provide the power for the one or more server devices is sufficient; and
disengage one or more of the super capacitor power modules to enable the one or more super capacitor power modules to recharge.

3. The server system as recited in claim 2, wherein the master power system manager is further configured to limit a recharge rate of the one or more super capacitor power modules to limit demand on the one or more power supplies.

4. The server system as recited in claim 1, wherein the power deficiency includes at least one of a power disturbance, a failure of one or more of the power supplies, or a loss of upstream power to one or more of the power supplies.

5. The server system as recited in claim 1, wherein the power deficiency includes an increased demand on one or more of the power supplies caused by an increased load on one or more of the server devices; and
wherein the master power system manager is further configured to engage one or more of the super capacitor power modules to reduce the demand on one or more of the power supplies.

6. The server system as recited in claim 1, wherein the capability of the one or more power supplies to provide the power relates to at least one of a demand on one or more of the power supplies, a status of an upstream power source for one or more of the power supplies, or a status of one or more of the power supplies.

7. A super capacitor power module, comprising:
super capacitor devices configured as an energy storage device;
a charging circuit configured to recharge the energy storage device from a power bus;
a regulation circuit configured to:
regulate power from the energy storage device by changing a voltage level of the energy storage device responsive to the voltage level of the energy storage device being below a voltage level of the power bus; and
provide supplemental power for a device that is connected to the power bus;
an isolation circuit configured to isolate the regulation circuit from the power bus; and
a module controller configured to:
receive an instruction to apply supplemental power to the power bus, the instruction received from a master power system manager that monitors a capability of the power bus to power the device, the master power system manager being configured to control other power system managers of other devices and mitigate a power deficiency by transmitting a throttle command to one or more of the other power system managers to throttle the respective device, the other power system managers being powered independently from one or more power supplies that provide power for the other devices; and
enable the regulation circuit and disable the isolation circuit to apply the supplemental power to the power bus based, at least in part, on the received instruction.

8. The super capacitor power module as recited in claim 7, wherein the isolation circuit includes one or more switching devices that are driven with a pulse modulated signal to apply the supplemental power to the power bus.

9. The super capacitor power module as recited in claim 7, wherein the module controller is further configured to enable the isolation circuit to reduce demand on the power bus responsive to the energy storage device being discharged.

10. The super capacitor power module as recited in claim 7, wherein the charging circuit includes a charge pump configured to recharge the energy storage device to the voltage level higher than the voltage level of the power bus.

11. The super capacitor power module as recited in claim 7, wherein the charging circuit is further configured to limit a recharge rate of the energy storage device to reduce demand on the power bus.

12. The super capacitor power module as recited in claim 7, wherein the regulation circuit includes a boost regulator configured to boost a voltage level of the power from the energy storage device responsive to the voltage level of the power from the energy storage device falling below the voltage level of the power bus.

13. The super capacitor power module as recited in claim 7, wherein the super capacitor devices are organized into one or more discrete arrays configured as one or more energy storage devices.

14. The super capacitor power module as recited in claim 7, wherein the isolation circuit includes an ORing controller to isolate an output of the regulation circuit from the power bus.

15. A computer-implemented method, comprising:
    monitoring, by a master power system manager, a capability of one or more power supplies to provide power for a server system of one or more server devices, the server system including one or more super capacitor power modules configured to provide supplemental power, and the server system including power system managers included at each of the one or more server devices, the power system managers being powered independently from the one or more power supplies that provide power for the one or more server devices, one of the power system managers implemented as the master power system manager being configured to control the other power system managers;
    determining by the master power system manager, based at least in part on the monitoring, that a capability of the one or more power supplies to provide the power for the server system is deficient;
    sending by the master power system manager, an instruction to the one or more super capacitor power modules at each of the one or more server devices based, at least in part, on said determining the power deficiency; and
    engaging by the master power system manager, the one or more super capacitor power modules to provide the supplemental power for the server system to mitigate the power deficiency by transmitting a throttle command to one or more of the other power system managers to throttle one or more of the respective server devices.

16. The computer-implemented method as recited in claim 15, further comprising:
    determining that the capability to provide the power for the server system is sufficient; and
    disengaging one or more of the super capacitor power modules to enable the one or more super capacitor power modules to recharge.

17. The computer-implemented method as recited in claim 15, further comprising limiting a recharge rate of the one or more super capacitor power modules to limit demand on the one or more power supplies.

18. The computer-implemented method as recited in claim 15, wherein the power deficiency includes an increased demand on one or more of the power supplies caused by the server system, the method further comprising engaging one or more of the super capacitor power modules to reduce demand on the one or more power supplies.

19. The computer-implemented method as recited in claim 15, wherein the capability of the one or more power supplies to provide the power relates to at least one of a demand on one or more of the power supplies, a status of an upstream power source for one or more of the power supplies, or a status of one or more of the power supplies.

20. The computer-implemented method as recited in claim 15, wherein the one or more super capacitor power modules are implemented to replace one or more batteries.

* * * * *